(12) United States Patent
Eaton et al.

(10) Patent No.: US 12,391,412 B2
(45) Date of Patent: Aug. 19, 2025

(54) WING DEPLOYMENT APPARATUS AND METHODS FOR AIRCRAFT

(71) Applicant: The Boeing Company, Arlington, VA (US)

(72) Inventors: Everett Ryan Eaton, St. Charles, MO (US); Keith Ryan Hollen, St. Charles, MO (US); Michael L. Oleshchuk, St. Charles, MO (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/890,495

(22) Filed: Sep. 19, 2024

(65) Prior Publication Data

US 2025/0121964 A1  Apr. 17, 2025

Related U.S. Application Data

(60) Provisional application No. 63/589,535, filed on Oct. 11, 2023.

(51) Int. Cl.
*B64U 20/50* (2023.01)
*B64U 30/12* (2023.01)
*B64U 80/82* (2023.01)

(52) U.S. Cl.
CPC .............. *B64U 20/50* (2023.01); *B64U 30/12* (2023.01); *B64U 80/82* (2023.01)

(58) Field of Classification Search
CPC ........ B64U 20/50; B64U 30/12; B64U 80/82; B64C 3/56; B64C 3/38; B64F 5/10; B64D 5/00; F42B 10/14; F42B 10/16; E05B 65/00
See application file for complete search history.

(56) References Cited

U.S. PATENT DOCUMENTS

| | | | | |
|---|---|---|---|---|
| 2,074,897 | A | * | 3/1937 | Everts ........................ B64C 3/40 244/102 R |
| 2,601,962 | A | * | 7/1952 | Douglas .................... B64C 5/04 244/89 |
| 2,683,574 | A | * | 7/1954 | Peterson .................... B64C 3/40 244/46 |
| 2,937,828 | A | * | 5/1960 | Clark ...................... F42B 10/14 244/91 |
| 3,196,793 | A | * | 7/1965 | Milenkovic ............. F42B 10/20 244/3.28 |

(Continued)

*Primary Examiner* — Medhat Badawi
(74) *Attorney, Agent, or Firm* — Hanley, Flight & Zimmerman, LLC

(57) ABSTRACT

Wing deployment apparatus and methods are disclosed herein. An example wing deployment apparatus includes a rotary actuator coupled to a torque coupler having a locking key disposed in an opening. The locking key moves between an outer radial position and an inner radial position. A lead screw is rotationally coupled to the torque coupler. The lead screw has a first recess to accept the locking key when the locking key is in the inner radial position. A nut is threadably engaged to the lead screw and includes a second recess to accept the locking key when the locking key is in the outer radial position. The locking key prevents movement of the nut along the axis of rotation when the locking key is in the outer radial position. A wing is operatively coupled to the nut to move the wing to a deployed position.

20 Claims, 9 Drawing Sheets

(56) References Cited

U.S. PATENT DOCUMENTS

| | | | | |
|---|---|---|---|---|
| 3,206,146 | A * | 9/1965 | Toms | B64C 3/40 244/46 |
| 3,212,732 | A * | 10/1965 | Scerbo | B64C 3/40 92/28 |
| 3,381,918 | A * | 5/1968 | Jacquart | B23D 15/14 244/46 |
| 3,405,891 | A * | 10/1968 | Jacquart | B64C 3/40 244/46 |
| 3,944,168 | A * | 3/1976 | Bizien | F42B 10/20 244/3.28 |
| 3,946,969 | A * | 3/1976 | Marburger | F42B 10/14 244/3.28 |
| 3,986,685 | A * | 10/1976 | Marburger | F42B 10/14 244/3.28 |
| 3,998,407 | A * | 12/1976 | Marburger | F42B 10/14 244/3.28 |
| 4,106,727 | A * | 8/1978 | Ortell | F42B 10/18 244/49 |
| 4,139,171 | A * | 2/1979 | Harris | B64C 33/00 244/22 |
| 4,175,720 | A * | 11/1979 | Craig | F42B 10/14 244/3.28 |
| 4,794,314 | A * | 12/1988 | Janu | F16K 31/046 251/286 |
| 4,813,634 | A * | 3/1989 | Zuck | B64D 25/08 244/89 |
| 5,035,378 | A * | 7/1991 | Spanovich | B64C 3/40 74/105 |
| 5,082,203 | A * | 1/1992 | Baubry | F42B 10/20 244/3.28 |
| 5,141,175 | A * | 8/1992 | Harris | F42B 15/36 244/3.28 |
| 5,192,037 | A * | 3/1993 | Moorefield | F42B 10/20 244/3.28 |
| 5,615,846 | A * | 4/1997 | Shmoldas | F42B 15/105 244/3.28 |
| 5,671,899 | A * | 9/1997 | Nicholas | B64U 30/16 244/3.28 |
| 5,674,027 | A * | 10/1997 | Warnaar | F16C 11/045 16/385 |
| 5,899,410 | A * | 5/1999 | Garrett | B64C 39/068 244/45 R |
| 5,915,650 | A * | 6/1999 | Petrovich | B64C 31/032 244/46 |
| 6,152,041 | A * | 11/2000 | Harris | F42B 10/38 244/3.25 |
| 6,186,443 | B1 * | 2/2001 | Shaffer | F42B 15/105 244/3.29 |
| 6,695,252 | B1 * | 2/2004 | Dryer | F42B 10/20 244/3.28 |
| 6,880,780 | B1 * | 4/2005 | Perry | F42B 10/14 244/49 |
| 7,185,847 | B1 * | 3/2007 | Bouchard | F42B 10/12 244/3.28 |
| 7,377,470 | B2 * | 5/2008 | Miyake | B64U 30/40 244/218 |
| 7,841,559 | B1 * | 11/2010 | O'Shea | B64U 30/12 244/49 |
| 7,906,749 | B2 * | 3/2011 | Fjerstad | F42B 10/14 244/3.28 |
| 8,324,544 | B2 * | 12/2012 | Palani | F42B 10/14 244/3.27 |
| 8,338,769 | B1 * | 12/2012 | Sankovic | B63B 32/66 244/49 |
| 8,350,200 | B1 * | 1/2013 | Hawkins | F42B 10/64 244/3.28 |
| 8,415,598 | B1 * | 4/2013 | Terhune | F42B 10/20 244/3.28 |
| 8,592,737 | B2 * | 11/2013 | Deschatre | F42B 10/14 244/3.28 |
| 8,816,261 | B1 * | 8/2014 | Blake | F42B 10/62 102/501 |
| 9,470,491 | B1 * | 10/2016 | Ginetto | F42B 10/14 |
| 9,689,650 | B2 * | 6/2017 | Vainshtein | F42B 15/01 |
| 9,702,673 | B1 * | 7/2017 | Ginetto | F42B 10/14 |
| 10,046,850 | B2 * | 8/2018 | Gamble | B64C 3/38 |
| 10,150,556 | B2 * | 12/2018 | Stanley | F42B 10/14 |
| 10,293,933 | B2 * | 5/2019 | Moshe | B64C 29/02 |
| 10,308,347 | B2 * | 6/2019 | Buttolph | B64U 10/40 |
| 10,358,205 | B2 * | 7/2019 | Saroka | B64C 1/14 |
| 10,429,159 | B2 * | 10/2019 | Dylla | F42B 10/14 |
| 10,641,590 | B2 * | 5/2020 | Buttolph | F42B 10/18 |
| 10,683,079 | B2 * | 6/2020 | Koessler | B64C 3/38 |
| 10,850,828 | B2 * | 12/2020 | Grubb | B64U 30/16 |
| 11,142,315 | B2 * | 10/2021 | McAdoo | B64D 31/18 |
| 11,292,596 | B2 * | 4/2022 | Grubb | B64C 23/069 |
| 11,353,300 | B2 * | 6/2022 | Murphy | F42B 10/18 |
| 11,644,287 | B2 * | 5/2023 | Travis | F42B 10/14 244/3.28 |
| 11,814,165 | B2 * | 11/2023 | Noskowicz | B64U 20/50 |
| 11,952,113 | B1 | 4/2024 | Hollen | B64C 3/56 |
| 12,188,264 | B2 * | 1/2025 | Hollen | E05B 65/00 |
| 12,208,894 | B2 * | 1/2025 | Hollen | B64C 7/00 |
| 12,214,871 | B2 * | 2/2025 | Kuperman | B64U 70/20 |
| 2008/0135677 | A1 * | 6/2008 | Oleshchuk | B64C 27/24 244/17.11 |
| 2009/0134281 | A1 * | 5/2009 | Engelbrecht | B64C 9/16 244/35 R |
| 2010/0308153 | A1 * | 12/2010 | Cohe | F42B 10/18 244/3.27 |
| 2012/0138727 | A1 * | 6/2012 | Fisher | F41F 1/08 244/3.15 |
| 2012/0280080 | A1 * | 11/2012 | Lubenow | B64U 10/25 244/49 |
| 2013/0214085 | A1 * | 8/2013 | Gaudette | F42B 10/16 244/3.27 |
| 2015/0353186 | A1 * | 12/2015 | Buttolph | B64C 9/00 244/201 |
| 2016/0355250 | A1 * | 12/2016 | Barnes | B64U 30/12 |
| 2017/0369150 | A1 * | 12/2017 | Finklea | B64D 17/80 |
| 2018/0111675 | A1 * | 4/2018 | Buttolph | F42B 10/14 |
| 2018/0170526 | A1 * | 6/2018 | Harrison | B64C 21/025 |
| 2022/0299063 | A1 * | 9/2022 | Smeal | B64C 9/16 |
| 2023/0211902 | A1 * | 7/2023 | Abramov | B64U 70/70 244/49 |
| 2024/0101245 | A1 * | 3/2024 | Hollen | B64C 3/56 |
| 2024/0102320 | A1 * | 3/2024 | Hollen | B64U 20/50 |
| 2024/0308645 | A1 * | 9/2024 | Hollen | B64C 7/00 |

* cited by examiner

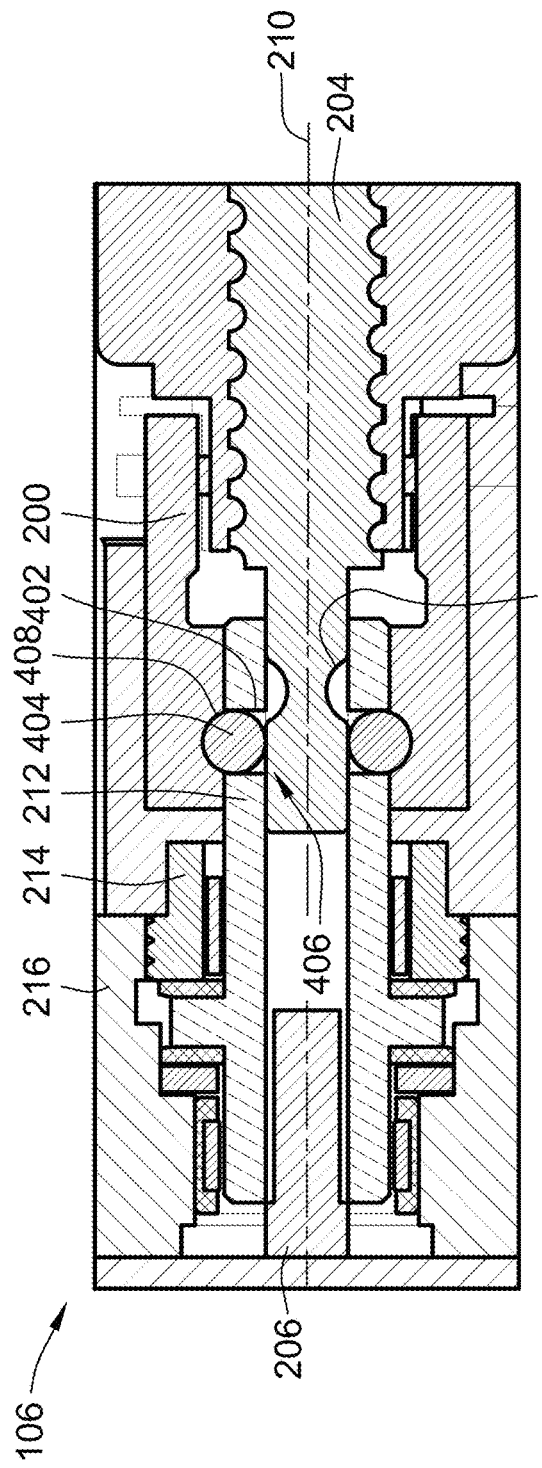
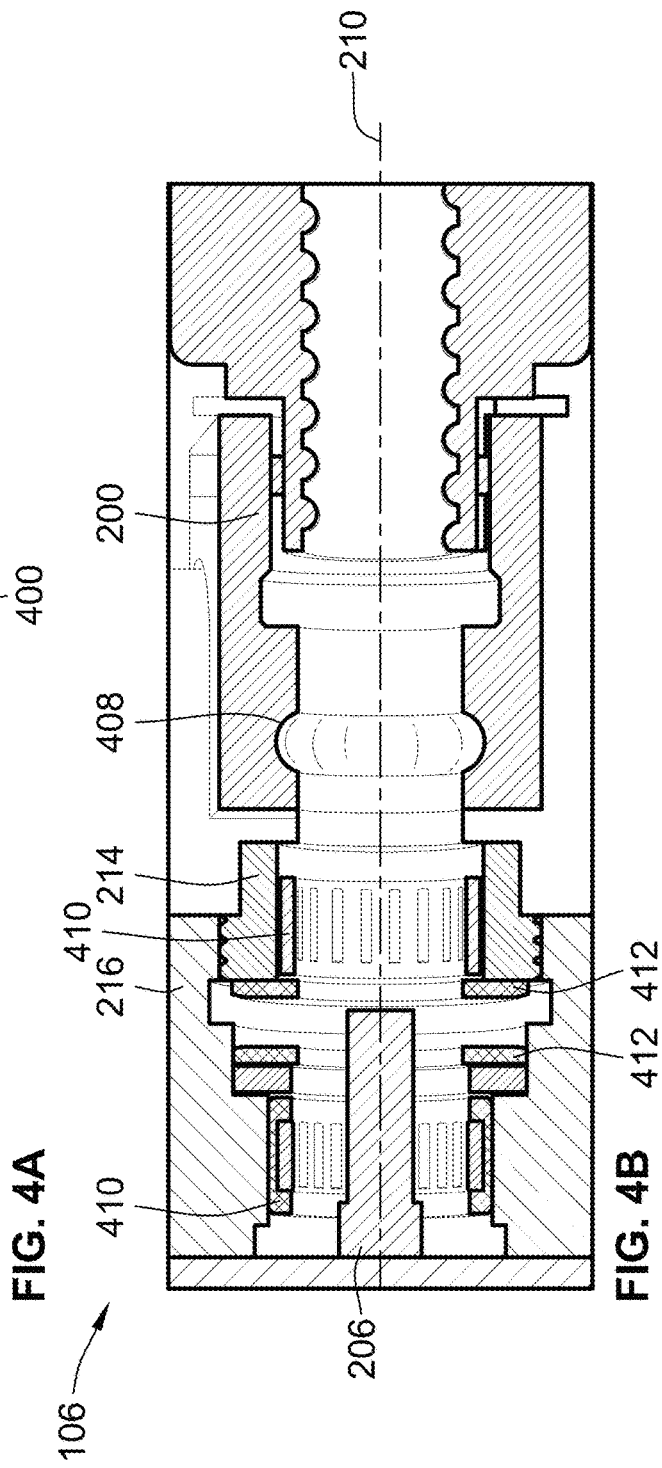
FIG. 4A
FIG. 4B

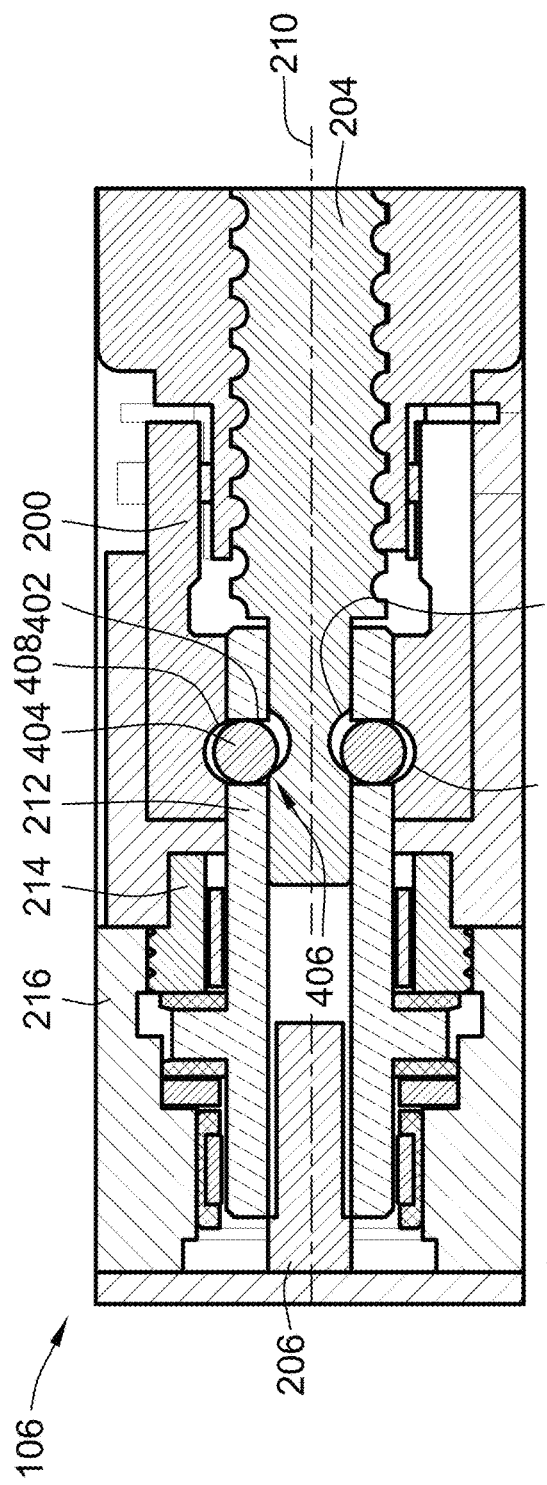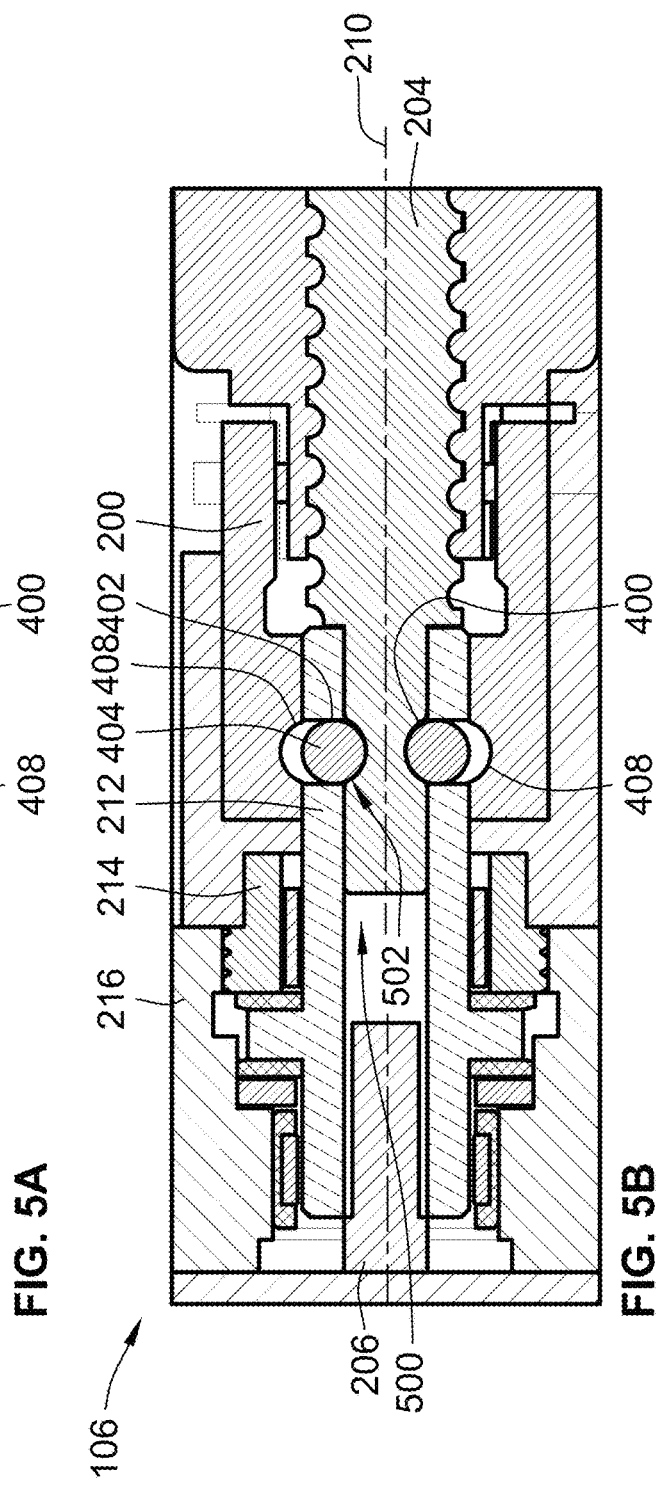
FIG. 5A
FIG. 5B

WING DEPLOYMENT APPARATUS AND METHODS FOR AIRCRAFT

RELATED APPLICATION

This patent claims the benefit of U.S. Provisional Patent Application No. 63/589,535, which was filed on Oct. 11, 2023. U.S. Provisional Patent Application No. 63/589,535 is hereby incorporated herein by reference in its entirety. Priority to U.S. Provisional Patent Application No. 63/589,535 is hereby claimed.

FIELD

This disclosure relates generally to aircraft and, more particularly, to wing deployment apparatus and methods for aircraft.

BACKGROUND

Air launched vehicles are aircraft that are carried on or outside of a host aircraft. The host aircraft carries the air launched vehicle from the ground to an operating altitude and speed. Once at operating altitude and speed, the air launched vehicle is launched and begins flight as an aircraft. Thus, the air launched vehicle does not require the thrust and high lift control surfaces required for traditional take-off. However, the wings of air launched vehicles occupy a significant volume of space and can interfere with the host aircraft. Therefore, the wings of air launched vehicles should be stowed or otherwise aerodynamically hidden until launched. Once launched, the wings of the air launched vehicle can be deployed and used to enable flight of the air launched vehicle.

SUMMARY

An example wing deployment apparatus disclosed herein includes a rotary actuator, having an axis of rotation, coupled to a torque coupler. The torque coupler includes an opening and a locking key disposed in the opening. The locking key moves in a radial direction relative to the axis of rotation between an outer radial position and an inner radial position. A lead screw is rotationally coupled to the torque coupler and moves along the axis of rotation relative to the torque coupler between a first axial position and a second axial position. The lead screw has a first recess to align with the opening when the lead screw is in the second axial position, the first recess to accept the locking key when the locking key is in the inner radial position. A nut is threadably engaged to the lead screw and rotationally fixed. The nut includes a second recess to accept the locking key when the locking key is in the outer radial position and the lead screw is in the first axial position. The locking key prevents movement of the nut along the axis of rotation relative to the torque coupler when the locking key is in the outer radial position and the lead screw is in the first axial position. A wing is operatively coupled to the nut to move the wing between a stowed and a deployed position in response to movement of the nut.

An example aircraft disclosed herein includes a fuselage, a wing movable between a stowed position and a deployed position, and a rotary actuator. The rotary actuator has an axis of rotation and is coupled to a torque coupler. The torque coupler includes an opening and a locking key disposed in the opening. The locking key moves in a radial direction relative to the axis of rotation between an outer radial position and an inner radial position. A lead screw is rotationally coupled to the torque coupler and moves along the axis of rotation relative to the torque coupler between a first axial position and a second axial position. The lead screw has a first recess to align with the opening when the lead screw is in the second axial position, to accept the locking key when the locking key is in the inner radial position. A nut is threadably engaged to the lead screw and rotationally fixed. The nut includes a second recess to accept the locking key when the locking key is in the outer radial position and the lead screw is in the first axial position. The locking key prevents movement of the nut along the axis of rotation relative to the torque coupler when the locking key is in the outer radial position and the lead screw is in the first axial position. The nut is operatively coupled to the wing to move the wing from the stowed position to the deployed position.

An example method of deploying a wing on an aircraft disclosed herein includes rotating a torque coupler about an axis of rotation, the torque coupler including a locking key disposed in an opening of the torque coupler. The method continues by translating a lead screw, the lead screw rotationally coupled to the torque coupler, toward the torque coupler from a first position to a second position along the axis of rotation. The lead screw is threadably engaged to a nut. The method continues by unlocking the nut from the torque coupler by disengaging the locking key from the nut. The method further includes translating the nut away from the torque coupler along the axis of rotation. The method concludes by deploying a wing in response to the translating of the nut.

BRIEF DESCRIPTION OF THE DRAWINGS

FIG. 4A illustrates a cross-section of the example wing deployment apparatus of FIG. 3.

FIG. 4B illustrates the cross-sectioned wing deployment apparatus of FIG. 4A with an example lead screw and an example torque coupler removed for clarity.

FIGS. 5A and 5B illustrate the example wing deployment apparatus of FIG. 4A as the example lead screw translates from an example first axial position as shown in FIG. 4A to an example second axial position as shown in FIG. 5B.

In general, the same reference numbers will be used throughout the drawing(s) and accompanying written description to refer to the same or like parts. The figures are not necessarily to scale.

Figure 1:
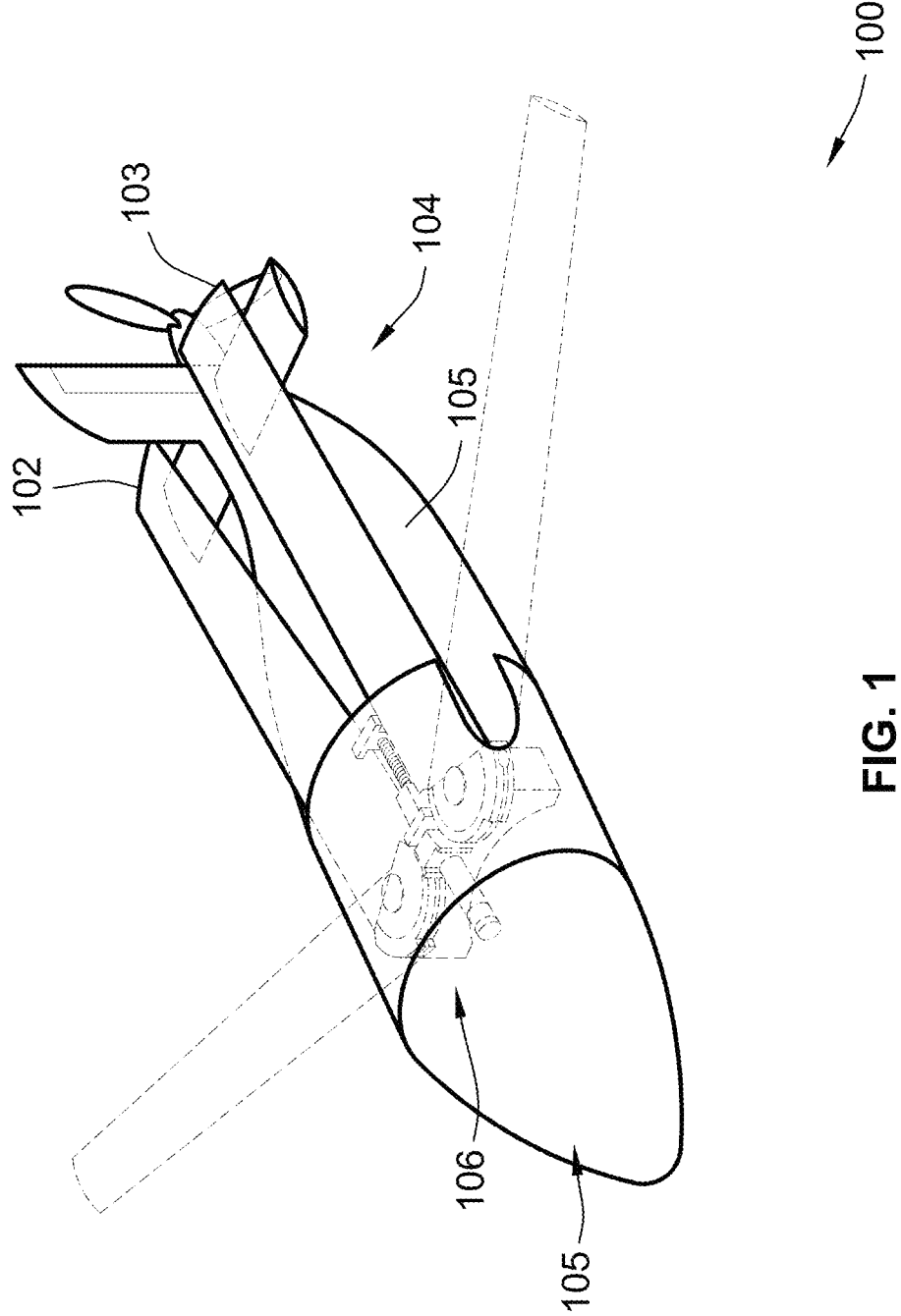
FIG. 1 is an illustration of an example aircraft with example wings in an example stowed position.

As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another.

As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

DETAILED DESCRIPTION

Many air launched vehicles have stowable wings that rotate, extend, or otherwise deploy after being released from the host aircraft. The stowable wings allow the air launched vehicle to be carried by the host aircraft while reducing the aerodynamic effects of the air launched vehicle on the host aircraft. Thus, known air launched vehicles have apparatus to deploy stowed wings, as well as apparatus to secure the stowed wings in place while carried by the host aircraft. If stowed wings are not adequately secured, flight conditions of the host aircraft can cause the wings to partially or fully deploy and disadvantageously affect the aerodynamics of the host aircraft. This could make the host aircraft less efficient and more difficult to control.

Example wing deployment apparatus described herein combine a deploying function with a holding/locking function. Thus, the stowable wings are securely held in place and later deployed using the same apparatus. The holding/locking function prevents undesired or premature deployment of the wings (e.g., while the aircraft is attached to the host). This consolidation of functions reduces the size and weight of the wing deployment apparatus relative to known wing deployment and wing securing apparatus of air launched vehicles. In some example wing deployment apparatus, the components and hardware that deploy the stowable wings are the same components that secure the stowable wings, further reducing the size, weight, complexity, and cost of the wing deployment apparatus. Thus, the air launched vehicle is made more efficient while also allowing the host aircraft to operate more efficiently.

FIG. 1 is an illustration of an example aircraft 100 with example wings 102 and 103 in an example stowed position 104. The wings 102 and 103 are coupled to a fuselage 105 and a wing deployment apparatus 106. In some examples, the aircraft 100 is an air launched vehicle. In other examples, the aircraft 100 is a drone (e.g., a manned or unmanned drone). The wing deployment apparatus 106 is shown with an example covering. In other examples, the wing deployment apparatus 106 can have other coverings (e.g., a shell, a fairing, etc.) at least partially above (e.g., covering, surrounding, shielding, etc.) the wing deployment apparatus 106. The wings 102 and 103 are shown with an example size and shape, but in other examples the wings 102 and 103 can be different sizes (e.g., different length and width) and shapes (e.g., contours).

Figure 2:
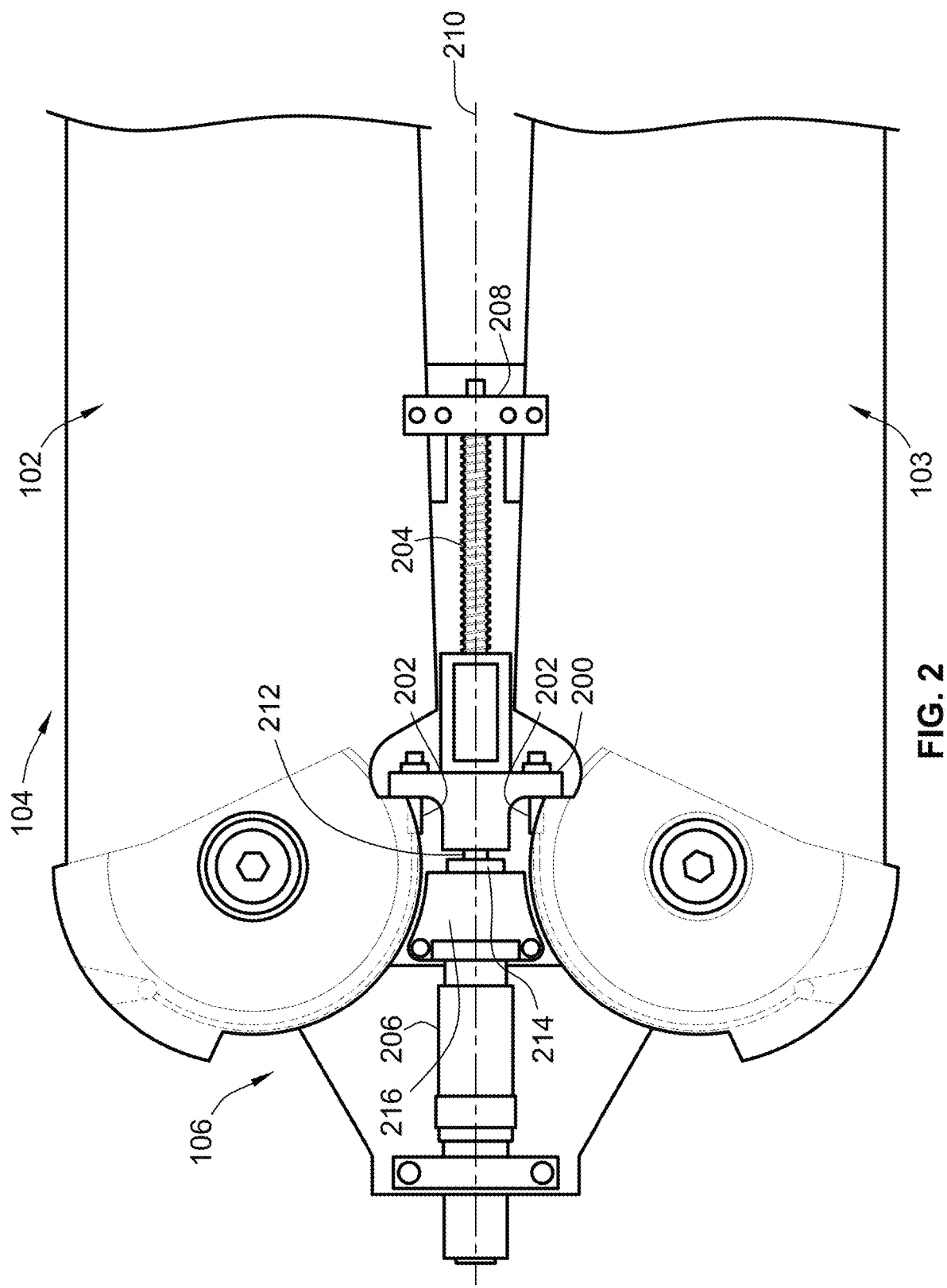
FIG. 2 illustrates the example wing deployment apparatus of the example aircraft of FIG. 1.

FIG. 2 illustrates the example wing deployment apparatus 106 of the example aircraft 100 of FIG. 1. The wings 102 and 103 are coupled to an example nut 200 via example cables 202. The example wings 102 and 103 move from the stowed position 104 to a deployed position 600 (detailed in FIG. 6) in response to the nut 200 moving (e.g., in a linear or longitudinal direction along a longitudinal axis of the nut 200). In some examples, the wings 102 and 103 rotate between the stowed position 104 and the deployed position 600 in response to the cables 202 pulling the wings 102 and 103 about a rotational coupling (e.g., pin, pivot, bearing, etc.). In other examples, the wings 102 and 103 are coupled to the nut 200 by different means (e.g., rods, linkages, fasteners, rack and pinion, gears, transmissions, etc.). In some examples, the wings 102 and 103 rotate between the stowed position 104 and the deployed position 600. In other examples, the wings 102 and 103 move between the stowed position 104 and the deployed position 600 through a complex motion (e.g., translation, rotation about multiple axes, a series of motions, stepped motions, etc.).

The nut 200 of FIG. 2 is threadably engaged to an example lead screw 204. For example, the nut 200 and the lead screw 204 provide a lead-screw assembly. The lead screw 204 is rotatably coupled to an example rotary actuator 206 on a first end and an example first bearing block 208 on a second end opposite the first end. In this way, an axis of rotation 210 is defined by the rotary actuator 206 and the first bearing block 208. The nut 200 translates (e.g., linearly) along the axis of rotation 210 as it is threadably engaged to the lead screw 204. In other words, the translational motion of the nut 200 is defined by the axis of rotation 210 of the lead screw 204. The example nut 200 of the illustrated example can be a tensioning nut, a ball lock, a follower, a ball nut, a ball lock follower, a sleeve, a slider and/or any other structure, fastener, or follower to convert rotational movement of the lead screw 204 into translational movement.

An example torque coupler 212 (further detailed in FIGS. 4A and 4B), rotatably couples the rotary actuator 206 and the lead screw 204. An example set screw 214 fixes the torque coupler 212 so that it cannot translate along the axis of rotation 210. The set screw 214 is threadably engaged to an example second bearing block 216. The rotary actuator 206 is fixed to the second bearing block 216. In other examples, the rotary actuator 206 is fixed at a different location and coupled to the torque coupler 212 through a transmission (e.g., gearbox, belt, or other coupling). In some examples, the first bearing block 208, the second bearing block 216, and the lead screw 204 are substantially coplanar with the wings 102 and 103 in the stowed position 104. In other examples, the first bearing block 208 and the lead screw 204 may have other orientations relative to the wings 102 and 103 (e.g., parallel, askew, orthogonal, etc.). In some examples, the lead screw 204 is located between the wings 102 and 103. In other examples, the lead screw 204 can be located in other positions relative to the wings 102 and 103.

Figure 3:
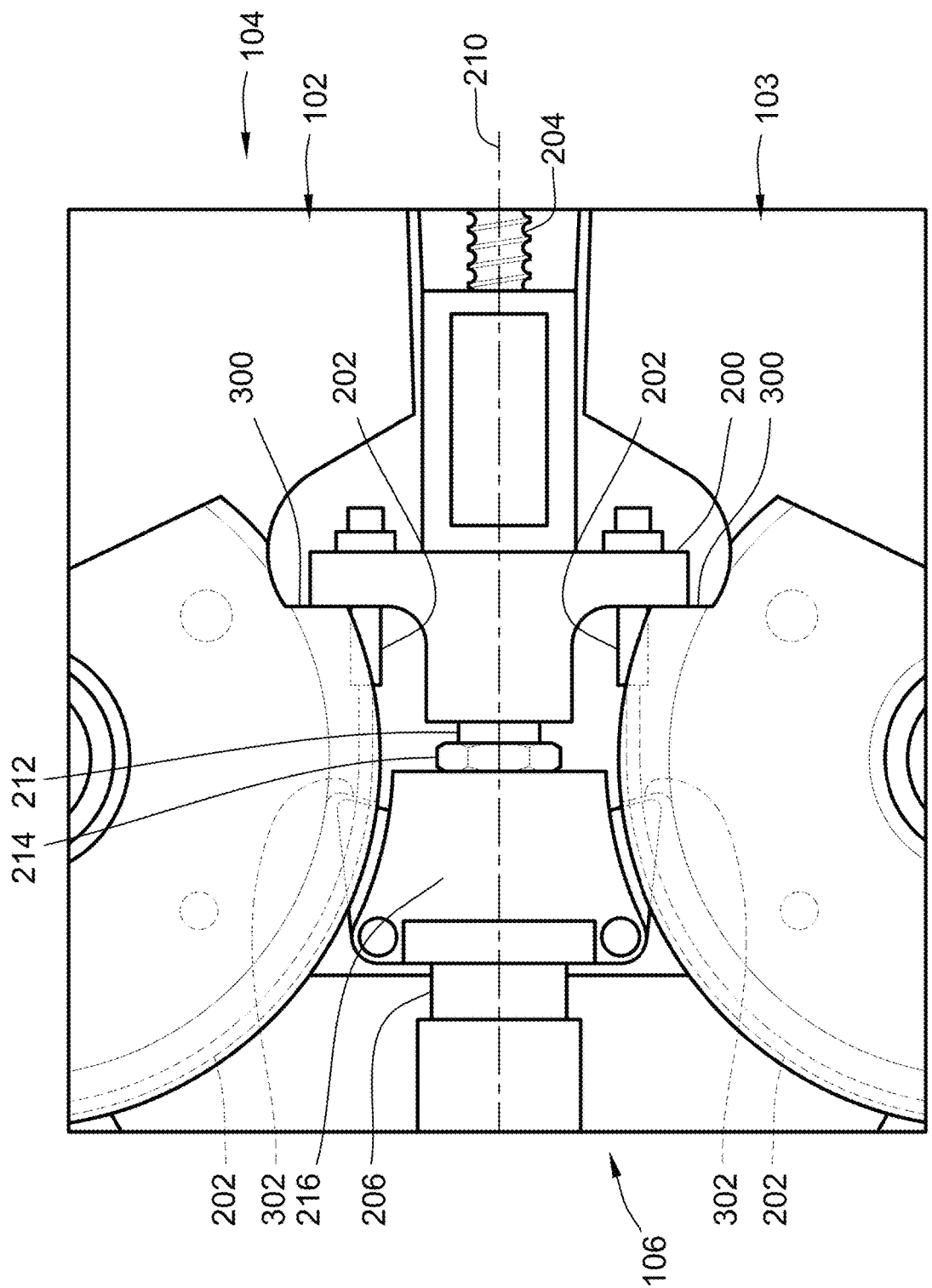
FIG. 3 illustrates an enlarged view of the example wing deployment apparatus of FIG. 2 showing the wings biased towards an example stowed position.

FIG. 3 illustrates an enlarged view of the example wing deployment apparatus 106 of FIG. 2 showing the wings 102 and 103 biased towards the example stowed position 104. The wing 102 has an example first stop surface 300 and an example second stop surface 302. The first stop surface 300 contacts the nut 200. The second stop surface 302 contacts the second bearing block 216. In this way, the wing 102 is fixed in place in the stowed position 104. In some examples, the first stop surface 300 and the second stop surface 302 are opposite each other, perpendicular to the axis of rotation 210. In other examples, the first and second stop surfaces 300 and 302 can have different locations, relative orientations, and/or contacting surfaces. The set screw 214 is coupled to the nut 200 through the torque coupler 212 (further detailed in FIGS. 4A and 4B). The set screw 214 can be rotated into the second bearing block 216, to which it is threadably engaged, to apply a force to move the nut 200 towards the second bearing block 216. Thus, the wing 102 is biased toward the stowed position 104 by the set screw 214. In other words, the set screw 214 causes compression in the wing 102 between the first stop surface 300 and the second stop surface 302. The compression of wing 102 between the first stop surface 300 and the second stop surface 302 biases the wing 102 to rotate towards the stowed position 104. While wing 102 is discussed in the above examples, example wing 103 can have similar first and second stop surfaces 300 and 302. In some examples, wings 102 and 103 have first and second stop surfaces 300 and 302 that are symmetric relative to the axis of rotation 210. The first and second stop surfaces 300 and 302 of wing 103 interact similarly with the nut 200 and the second bearing block 216 to bias the wing 103 toward the stowed position 104.

FIG. 4A illustrates a cross-section of the example wing deployment apparatus 106 of FIG. 3. The example rotary actuator 206 is rotatably coupled to the example torque coupler 212. The torque coupler 212 is rotatably coupled to the example lead screw 204. The lead screw 204 has a first recess 400 disposed within the torque coupler 212. The first recess 400 is formed on an outer surface (e.g., a neck or non-threaded outer surface) of the lead screw 204 (e.g., positioned in a cavity of the torque coupler 212). In some examples, the rotary actuator 206 is positioned opposite the lead screw 204. Thus, the rotary actuator 206, the torque coupler 212, and the lead screw 204 are rotatably coupled and coaxial on the axis of rotation 210. In other examples, the rotary actuator 206 has a different axis of rotation than the lead screw 204 and the torque coupler 212, and is coupled through a transmission (e.g., gearbox, belt, or other coupling). The torque coupler 212 is translationally fixed by the set screw 214. In other words, the torque coupler 212 cannot translate along the axis of rotation 210 because it is translationally fixed by the set screw 214. The torque coupler 212 has an example opening 402 (or recess) to contain an example locking key 404. In some examples, the locking key 404 has a spherical shape (e.g., ball bearing shape). In other examples, the locking key 404 can have a different shape (e.g., disc shape, cuboid shape, cylindrical shape, etc.). The opening 402 limits motion of the locking key 404. For example, the opening 402 of the torque coupler 212 traps the locking key 404 to limit or prevent translational movement of the nut 200. In some examples, the locking key 404 can move in a radial direction relative to the axis of rotation 210. In other examples, the locking key 404 can move in the radial direction and rotate around the axis of rotation 210. In some examples, the locking key 404 moves along a path defined by the opening 402.

As shown in FIG. 4A, the locking key 404 is in an example outer radial position 406. The locking key 404 is disposed in an example second recess 408 of the nut 200 while the locking key 404 is in the outer radial position 406. In the example wing deployment apparatus 106 of FIG. 4A, the locking key 404 is radially fixed in the outer radial position between the second recess 408 and the lead screw 204 (e.g., a portion of the outer surface not including the first recess 400). The locking key 404 is translationally fixed along the axis of rotation 210 by contacting the opening 402 of the torque coupler 212. Thus, locking key 404 can rotate freely around the axis of rotation 210, while fixed at a radial and translational position relative to the axis of rotation 210. The nut 200 is translationally fixed along the axis of rotation 210 by the locking key 404. In other words, the nut 200 cannot move (e.g., linearly, or longitudinally) along the axis of rotation 210 while the locking key 404 is in the outer radial position 406 and the locking key 404 is contacting the second recess 408. As described above, the nut 200 is in contact with the wing (e.g., in contact with the wing 102 at the first stop surface 300, as shown in FIG. 3). Thus, the wing 102 is fixed in position by the nut 200, and the nut 200 is fixed in position by the locking key 404. In other words, the wing 102 is locked in a stowed position (e.g., the stowed position 104 of FIG. 1) when the locking key 404 is in the outer radial position 406. Furthermore, as the locking key 404 is translationally fixed by the opening 402 and the torque coupler 212, the wing 102 can be biased towards the stowed position by moving the torque coupler 212 translationally along the axis of rotation 210 in the direction of the first stop surface of the wing (e.g., first stop surface 300) via the set screw 214. In other words, set screw 214 can be used to bias the wings (e.g., the wings 102 and 103 of FIG. 1) towards the stowed position (e.g., the stowed position 104 of FIG. 1).

FIG. 4B illustrates the cross-sectioned wing deployment apparatus 106 of FIG. 4A with parts removed for clarity. The torque coupler 212, the locking key 404, and lead screw 204 have been removed to provide a clearer view. The example nut 200 is shown with the second recess 408 (e.g., an annular recess). In some examples, the second recess 408 is an axially symmetric groove along an inner surface of the nut 200. In some examples, the second recess 408 is shaped to urge the locking key 404 (not shown) away from the second recess 408 as the nut 200 is moved away from the torque coupler 212 (not shown). In some examples, there are a plurality of first recesses in the lead screw 204, a plurality of locking keys 404, and a plurality of openings 402 in the torque coupler 212. The plurality of locking keys 404 supports the forces of fixing the nut 200 more evenly, reducing friction and improving performance of the wing deployment apparatus 106. In some examples, the torque coupler 212 is supported by bearings 410 (e.g., roller bearings, ball bearings, pin bearings, etc.) and thrust bearings 412 (e.g., thrust roller bearings, thrust ball bearings, thrust pin bearings, etc.). The bearings 410 and thrust bearings 412 allow the torque coupler 212 to rotate freely while supporting loads from the nut 200 and the lead screw 204.

In some examples, the first recess 400 is an annular recess or channel formed on the outer surface of the lead screw 204. In some examples, the first recess 400 is a plurality of recesses or channels formed on the outer surface (e.g., radially spaced about 45 degrees, 30 degrees, etc.) of the lead screw 204. In some examples, the second recess 408 is an annular recess or channel formed on an inner surface or wall of the nut 200. In some examples, the second recess 408 is a plurality of recesses or channels formed on the inner surface (e.g., radially spaced about 45 degrees, 30 degrees, etc.) of the nut 200. In some examples, a number of first recesses 400 corresponds to (e.g., equals to) a number of second recesses 408. In some examples, the locking key 404 is a plurality of ball bearings radially spaced (e.g., 45 degrees, 30 degrees, etc.) about the outer surface of the lead screw 204.

FIGS. 5A and 5B illustrate the example wing deployment apparatus 106 of FIG. 4A as the example lead screw 204 translates from an example first axial position as shown in FIG. 4A to an example second axial position 500 as shown in FIG. 5B (e.g., an intermediate position between the stowed position and the deployment position). The example locking key 404, as shown in FIG. 5A, is leaving the example outer radial position 406 and moving away from the example second recess 408. The example nut 200 begins to change position relative to the example torque coupler 212. The lead screw 204 is rotationally coupled to torque coupler 212 and the rotary actuator 206. The rotary actuator 206 rotates the lead screw 204, which is threadably engaged to nut 200, and causes the lead screw 204 to translate along the axis of rotation 210. In some examples the lead screw 204 is a ball screw and is threadably engaged with a ball nut of the nut 200. In some examples, the lead screw 204 is shaped (e.g., square shaped, splined, keyed, etc.) to fit inside the torque coupler 212 and transfer torque. The lead screw 204 is rotatably coupled to the torque coupler 212 and can slide freely (e.g., translate in the axial direction freely) when the locking key 404 is in the outer radial position 406.

FIG. 5B shows the example lead screw 204 in an example second axial position 500 and the example locking key 404 in an example inner radial position 502. The first recess 400 of the lead screw 204 aligns with the opening 402 (e.g., the center of the first recess 400 has substantially the same position along the axis of rotation 210 as the center of the opening 402) when the lead screw 204 is in the second axial position 500. In contrast, the first recess 400 does not align with the opening 402 (e.g., distance between the first recess 400 and the rotary actuator 206 is greater than the distance between the opening 402 and the rotary actuator 206) when the lead screw 204 is in first axial position (as shown in FIG. 4A). The locking key 404 contacts the first recess 400 of the lead screw 204 when the locking key 404 is in the inner radial position 502 and the lead screw 204 is in the second axial position 500. When the lead screw 204 approaches the second axial position 500 (e.g., part or all of the first recess 400 aligns with the opening 402 along the axis of rotation 210), the locking key 404 is no longer fixed radially relative to the axis of rotation 210. In other words, the locking key 404 is fixed in the outer radial position 406 until the lead screw 204 approaches the second axial position 500 (e.g., part or all of the first recess 400 aligns with the opening 402 along the axis of rotation 210). When the locking key 404 is no longer fixed in the outer radial position 406, the nut 200 is no longer translationally fixed and can move along the axis of rotation 210. In other words, when the lead screw 204 approaches the second axial position 500, the nut 200 is unlocked.

FIG. 5A illustrates that the locking key 404 begins to move from the outer radial position 406 towards the inner radial position 502 (shown in FIG. 5B) once the lead screw 204 approaches the second axial position 500 (shown in FIG. 5B). The locking key 404 no longer fixes any component (e.g., the nut 200 and/or the lead screw 204) along the axis of rotation 210 as it leaves the outer radial position 406. Thus, as the rotary actuator 206 continues to rotate, the lead screw 204 translates towards the torque coupler 212 and the nut 200 translates away from the torque coupler 212 along the axis of rotation 210. In other words, once the lead screw 204 approaches the second axial position 500 (e.g., part or all of the first recess 400 aligns with the opening 402 along the axis of rotation 210), the nut 200 begins to translate away from the torque coupler 212. As the tensioning nut 200 begins to translate, the second recess 408 of the nut 200 urges the locking key 404 towards the inner radial position 502. The nut 200 continues to translate away from the torque coupler 212, which forces the locking key 404 to be in the inner radial position 502. In this way, the locking key 404 is in the inner radial position 502, contacting the first recess 400 while the lead screw 204 is in the second axial position 500. In some examples, the locking key 404 is fixed in the radial direction between the nut 200 and the lead screw 204 while the lead screw 204 is in the second axial position 500. In other examples, the locking key 404 is urged towards the inner radial position 502 while the lead screw 204 is in the second axial position 500 but not fixed (e.g., loosely held, released, unfixed, etc.) after the second recess 408 translates fully past the opening 402. In some examples, the lead screw 204 stops translating once the locking key 404 enters the inner radial position 502. In some examples, the lead screw 204 stops translating once the threaded portion of lead screw 204 contacts the torque coupler 212.

Figure 6:
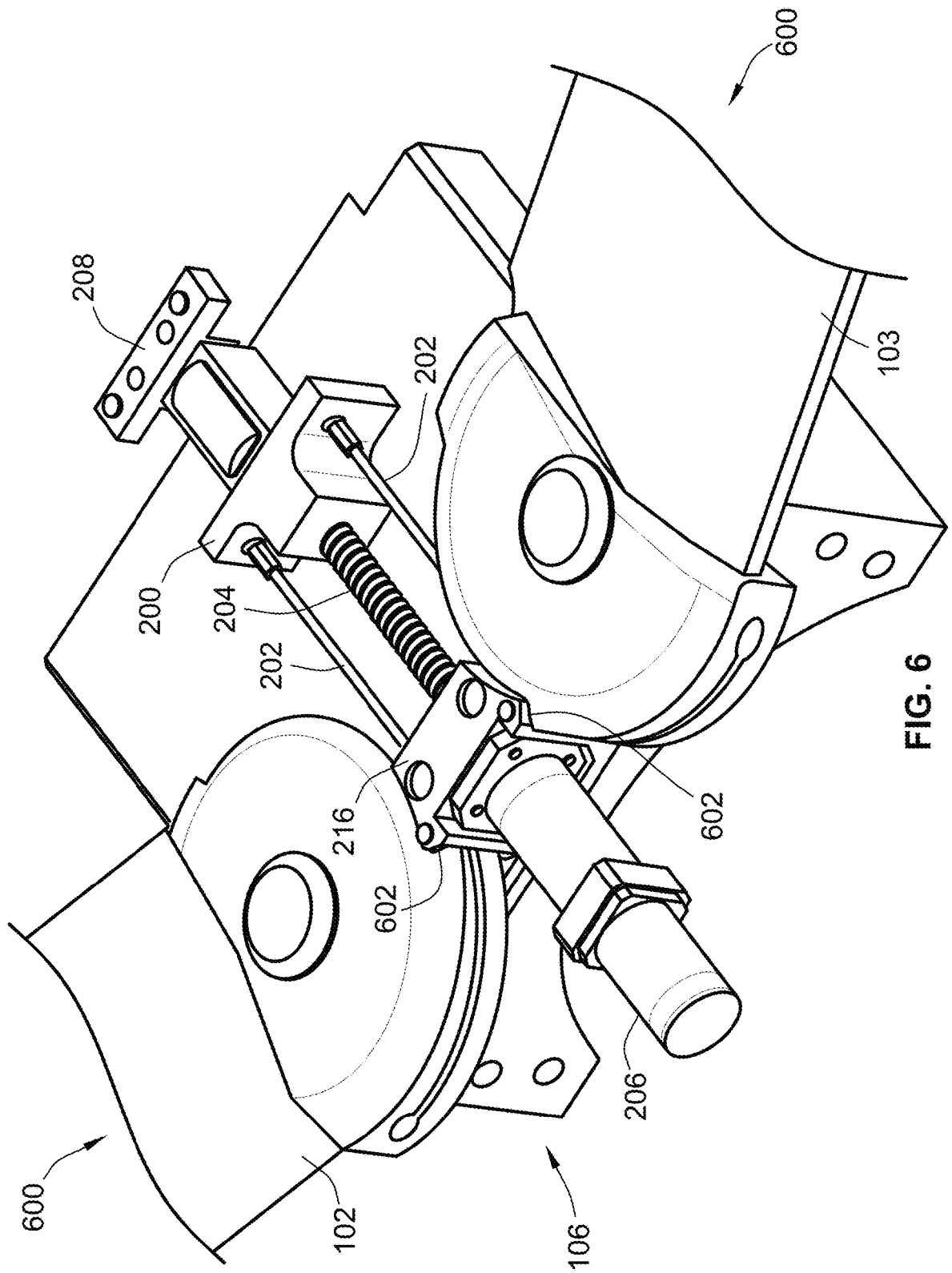
FIG. 6 illustrates the example wing deployment apparatus of FIG. 2 with the wings in an example deployed position.

FIG. 6 illustrates the example wing deployment apparatus 106 of FIG. 2 with the wings 102 and 103 in the example deployed position 600. The wings 102 and 103 contact the second bearing block 216 on an example third stop surface 602. The nut 200 is coupled to the wing 102 through the cable 202. In the deployed position 600, the nut 200 is translated towards first bearing block 208 until the third stop surface 602 makes contact with the wing 102. In other words, the third stop surfaces 602 stop the motion of the wings 102 and 103. The rotary actuator 206 no longer rotates the lead screw 204 as the nut 200 reaches the end of its travel. The cables 202 are tensioned by the nut 200, thereby biasing the wings 102 and 103 towards the deployed position 600.

Figure 7A:
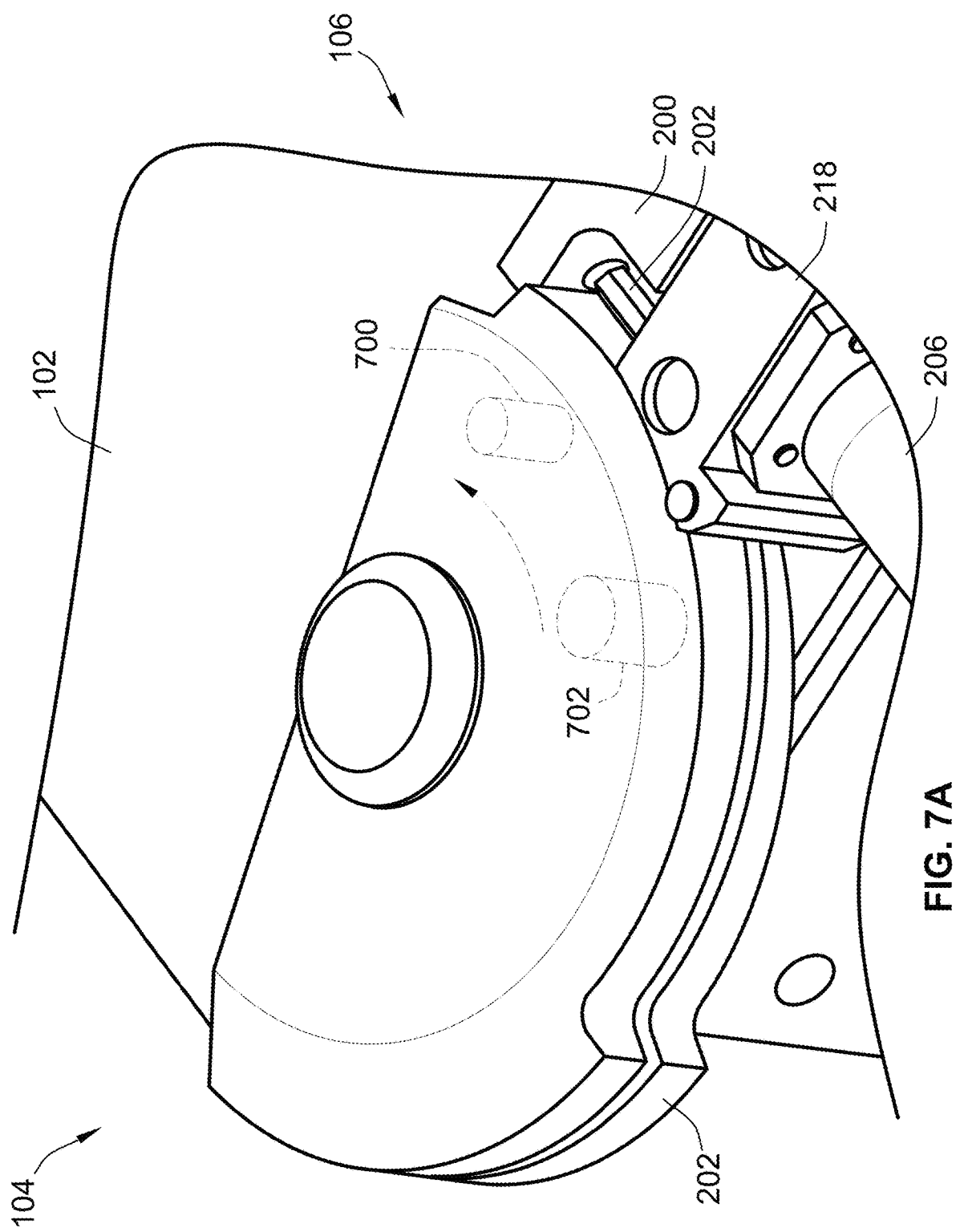
FIGS. 7A and 7B illustrate the example wing deployment apparatus of FIG. 6 with an example locking pin to engage with the example wing.
Figure 7B:
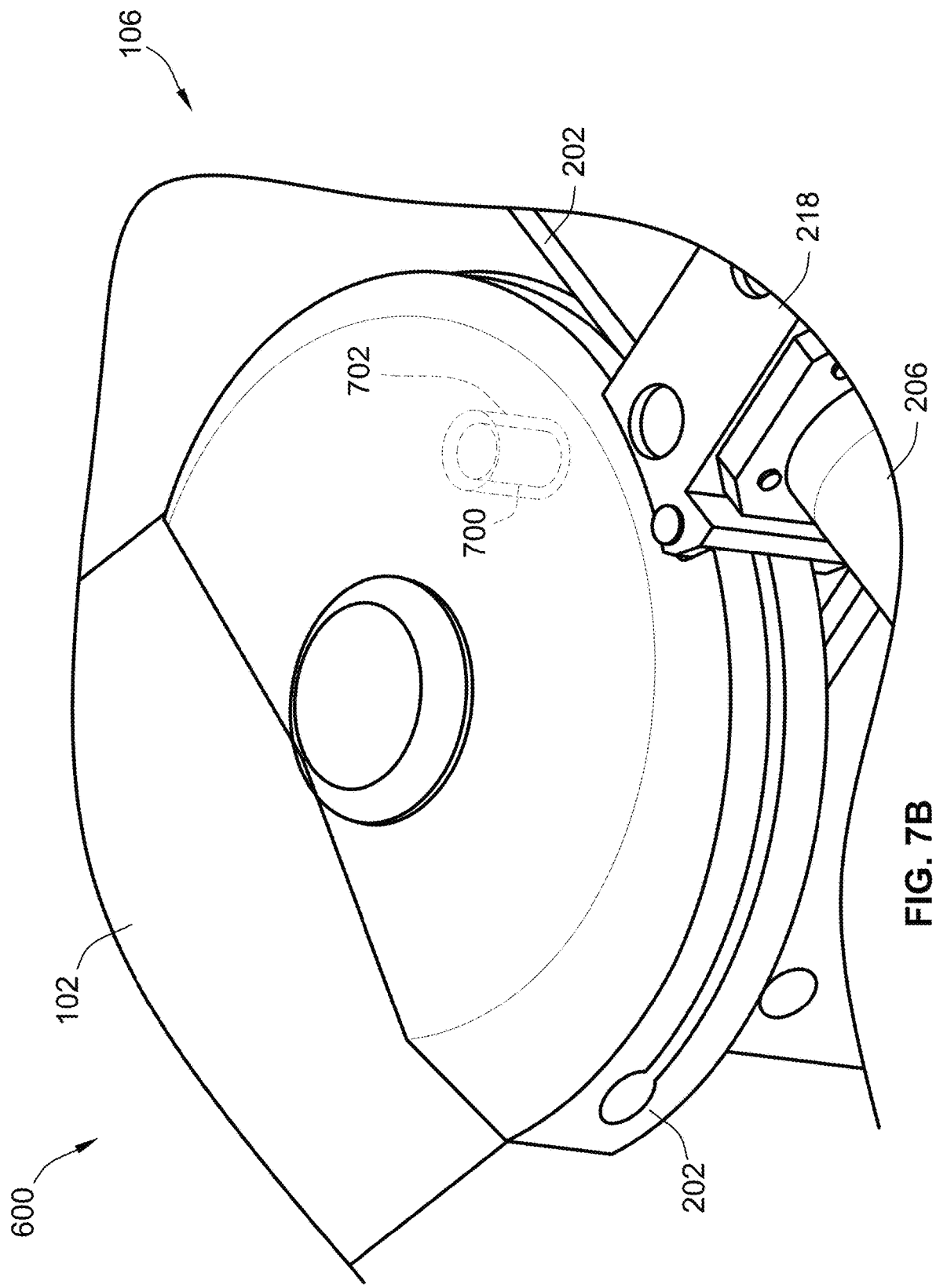

FIGS. 7A and 7B illustrate the example wing deployment apparatus 106 of FIG. 6 with an example locking pin 700 to engage with the example wing 102. The wing 102 has an example pin recess 702 to receive the locking pin 700. In some examples, the pin recess 702 and the locking pin 700 have a cylindrical shape. In other examples, the locking pin 700 can have other shapes or cross sections (e.g., rectangular, semicircle, etc.). When the wing 102 is in the stowed position 104, as shown in FIG. 7A, the locking pin 700 does not align with the pin recess 702. When the wing 102 is in the deployed position 600, as shown in FIG. 7B, the locking pin 700 and the pin recess 702 align. FIGS. 7A and 7B show the locking pin 700 and the pin recess 702 in one example orientation. In other examples, the locking pin 700 and the pin recess 702 can have other orientations relative to the wing (e.g., above the wings, on the side of the wings, etc.). The locking pin 700 enters the pin recess 702 to fix the wing 102 in the deployed position 600. In some examples, when the locking pin 700 fixes the wing 102 in the deployed position 600, the rotary actuator 206 becomes unpowered and the tension in the cable 202 is released. Thus, the aircraft 100 maintains the wing 102 in the deployed position 600 without sending power (e.g., electricity) to the rotary actuator 206 by engaging the locking pin 700 in the pin recess 702 of the wing 102. This lowers the power requirement and allows the aircraft 100 to have smaller power supplies (e.g., batteries), lowering the weight and related inefficiencies of the aircraft 100.

Figure 8:
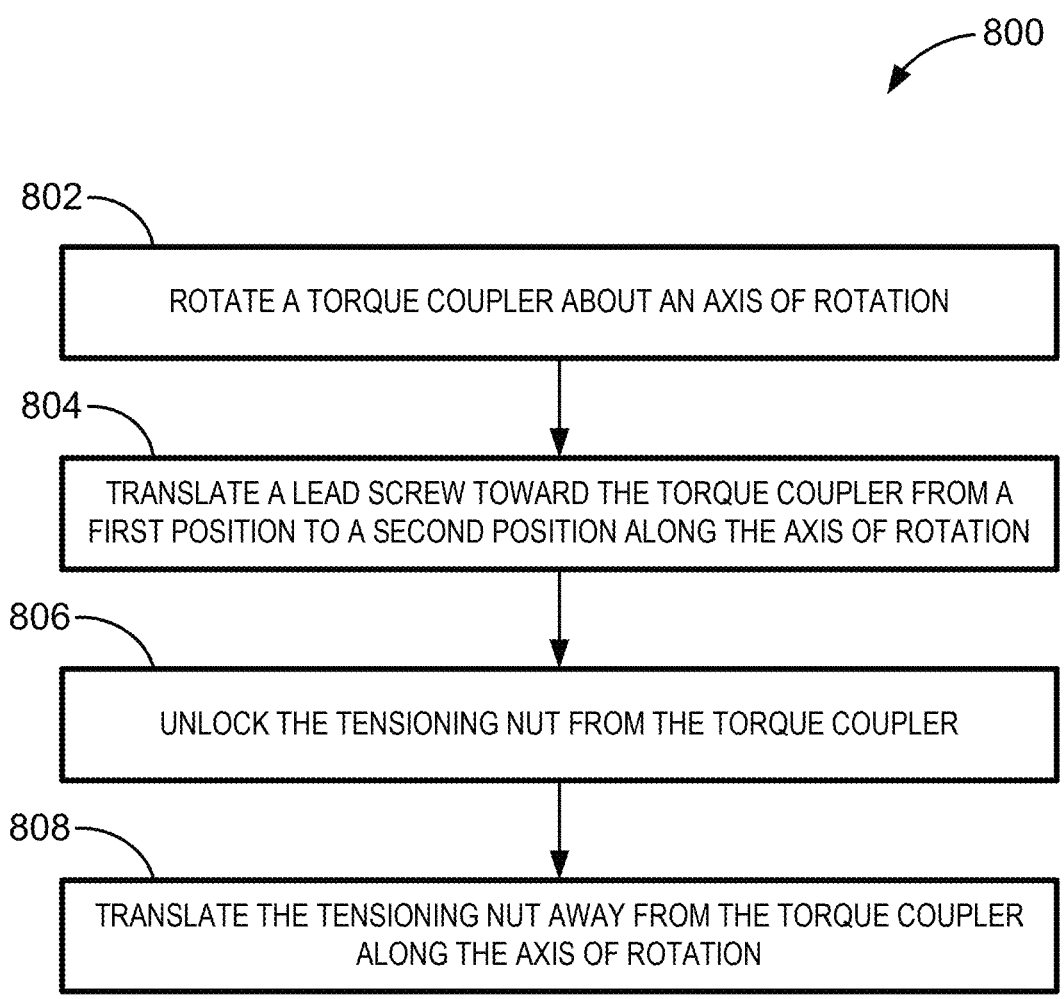
FIG. 8 is a flowchart representative of an example method for deploying an example wing of an example aircraft.

FIG. 8 is a flowchart representative of an example method 800 for deploying an example wing of an example aircraft. The method 800 begins with rotating a torque coupler (e.g., torque coupler 212) about an axis of rotation (e.g., the axis of rotation 210) (block 802). In some examples, the torque coupler is rotated directly by a rotary actuator (e.g., rotary actuator 206). In other examples, the torque coupler is rotated by the rotary actuator through another component (e.g., transmission, gear box, torque multiplier, etc.). The rotary actuator is, in some examples, an electric motor. In other examples, the rotary actuator can have other power sources (e.g., hydraulic, pneumatic, etc.). The method 800 continues with translating a lead screw (e.g., lead screw 204) towards the torque coupler from a first position to a second position along the axis of rotation (block 804). The lead screw is coupled to the torque coupler and threadably engaged to a tensioning nut (e.g., nut 200). The tensioning nut is translationally locked to the torque coupler by locking key (e.g., locking key 404), so rotating the torque coupler results in the lead screw translating towards or away from the torque coupler based on the direction of the rotation. The method 800 continues with unlocking a tensioning nut (e.g., nut 200) from the torque coupler (block 806). The locking key moves away from the nut (e.g., disengages from the nut) and towards a recess (e.g., first recess 400) in the lead screw when the lead screw is in the second axial position. Thus, the locking key leaves contact with the nut and unlocks the nut, allowing it to translate freely along the axis of rotation. In some examples, the locking key moves towards the lead screw when unlocking the nut and translationally locks the lead screw to the torque coupler. In other examples, the locking key moves into the recess of the lead screw without affecting the motion of the lead screw. The method continues by translating the nut away from the torque coupler along the axis of rotation (block 808). The nut is threadably engaged to the lead screw. As the lead screw continues to rotate, the nut begins to translate due to the threaded coupling with the lead screw. The method finishes by deploying a wing (e.g., wing 102) in response to the translating of the nut (block 810). The wing is coupled to the nut, thus translating the nut causes the wing to move from a stowed position (e.g., stowed position 104) to a deployed position (e.g., deployed position 600).

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

The following paragraphs provide various examples of wing deployment apparatus and methods for aircraft disclosed herein:

Example 1 is a wing deployment apparatus including a rotary actuator having an axis of rotation coupled to a torque coupler. The torque coupler includes an opening with a locking key disposed in the opening. The locking key is movable in a radial direction relative to the axis of rotation between an outer radial position and an inner radial position. A lead screw is rotationally coupled to the torque coupler and moves along the axis of rotation relative to the torque coupler between a first axial position and a second axial position. The lead screw has a first recess to align with the opening when the lead screw is in the second axial position to accept the locking key when the locking key is in the inner radial position. A nut is threadably engaged to the lead screw and rotationally fixed. The nut includes a second recess to accept the locking key when the locking key is in the outer radial position and the lead screw is in the first axial position. The locking key prevents movement of the nut along the axis of rotation relative to the torque coupler when the locking key is in the outer radial position and the lead screw is in the first axial position. A wing is operatively coupled to the nut to move the wing between a stowed and a deployed position in response to the movement of the nut.

Example 2 includes the wing deployment apparatus of example 1, where the wing contacts the nut when the wing is in the stowed position and the lead screw is in the first axial position. The nut prevents movement of the wing towards the deployed position.

Example 3 includes the wing deployment apparatus of example 2, further including a set screw coupled to the torque coupler. The set screw applies a force to the torque coupler along the axis of rotation. The force moves the nut and biases the wing towards the stowed position while the lead screw is in the first axial position.

Example 4 includes the wing deployment apparatus of example 1, where the second recess is shaped to urge the locking key towards the inner radial position as the nut moves away from the torque coupler along the axis of rotation.

Example 5 includes the wing deployment apparatus of example 1, where the locking key has a spherical shape.

Example 6 includes the wing deployment apparatus of example 1, where the second recess is an axially symmetric groove along an inner surface of the nut.

Example 7 includes the wing deployment apparatus of example 6, including a plurality of first recesses, a plurality of openings, and a plurality of locking keys.

Example 8 includes the wing deployment apparatus of example 1, where the lead screw is a ball screw, and the nut includes a ball nut.

Example 9 includes the wing deployment apparatus of example 1, where the rotary actuator is an electric motor.

Example 10 includes the wing deployment apparatus, including a locking pin to engage with the wing when the wing is in the deployed position. The locking pin prevents movement of the wing.

Example 11 is an aircraft including a fuselage and a wing that moves between a stowed position and a deployed position. The aircraft includes a rotary actuator that has an axis of rotation and is coupled to a torque coupler. The torque coupler includes an opening. A locking key is disposed in the opening and moves in a radial direction, relative to the axis of rotation, between an outer radial position and an inner radial position. A lead screw is rotationally coupled to the torque coupler and moves along the axis of rotation relative to the torque coupler between a first axial position and a second axial position. The lead screw has a first recess that aligns with the opening when the lead screw is in the second axial position. The first recess accepts the locking key when the locking key is in the inner radial position. A nut is threadably engaged to the lead screw and rotationally fixed. The nut includes a second recess to accept the locking key when the locking key is in the outer radial position and the lead screw is in the first axial position. The locking key prevents movement of the nut along the axis of rotation relative to the torque coupler when the locking key is in the outer radial position and the lead screw is in the first axial position. The nut is operatively coupled to the wing to move the wing from the stowed position to the deployed position.

Example 12 includes the aircraft of example 11, where the wing contacts the nut when the wing is in the stowed position and the lead screw is in the first axial position. The nut prevents movement of the wing towards the deployed position.

Example 13 includes the aircraft of example 12, further including a set screw coupled to the torque coupler. The set screw applies a force to the torque coupler along the axis of rotation. The force moves the nut and biases the wing towards the stowed position while the lead screw is in the first axial position.

Example 14 includes the aircraft of example 11, where the locking key has a spherical shape.

Example 15 includes the aircraft of example 11, further including a plurality of first recesses, a plurality of openings, and a plurality of locking keys.

Example 16 includes the aircraft of example 11, where the lead screw is a ball screw, and the nut includes a ball nut.

Example 17 includes the aircraft of claim 11, where the rotary actuator is an electric motor.

Example 18 includes the aircraft of example 11, including a locking pin to engage with the wing when the wing is in the deployed position. The locking pin prevents movement of the wing.

Example 19 is a method of deploying a wing on an aircraft including rotating a torque coupler about an axis of rotation. The torque coupler includes a locking key disposed in an opening of the torque coupler. The method continues with translating a lead screw rotationally coupled to the torque coupler toward the torque coupler, from a first position to a second position along the axis of rotation. The lead screw is threadably engaged to a nut. The method continues with unlocking the nut from the torque coupler by disengaging the locking key from the nut. The method continues by translating the nut away from the torque coupler along the axis of rotation and deploying a wing in response to the translating of the nut.

Example 20 includes the method of example 19, further including locking the wing with a locking pin after deploying the wing. The locking pin prevents motion of the wing.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A wing deployment apparatus comprising:
   a rotary actuator having an axis of rotation and coupled to a torque coupler, the torque coupler including an opening;
   a locking key disposed in the opening, the locking key movable in a radial direction relative to the axis of rotation between an outer radial position and an inner radial position;
   a lead screw rotationally coupled to the torque coupler and movable along the axis of rotation relative to the torque coupler between a first axial position and a second axial position, the lead screw having a first recess to align with the opening when the lead screw is in the second axial position to accept the locking key when the locking key is in the inner radial position;
   a nut threadably engaged to the lead screw and rotationally fixed, the nut including a second recess to accept the locking key when the locking key is in the outer radial position and the lead screw is in the first axial position, the locking key to prevent movement of the nut along the axis of rotation relative to the torque coupler when the locking key is in the outer radial position and the lead screw is in the first axial position; and
   a wing operatively coupled to the nut to move the wing between a stowed and a deployed position in response to movement of the nut.

2. The apparatus as recited in claim 1, wherein the wing contacts the nut when the wing is in the stowed position and the lead screw is in the first axial position, the nut to prevent movement of the wing towards the deployed position.

3. The apparatus as recited in claim 2, further including a set screw coupled to the torque coupler, the set screw to apply a force to the torque coupler along the axis of rotation, the force to move the nut and to bias the wing towards the stowed position while the lead screw is in the first axial position.

4. The apparatus as recited in claim 1, wherein the second recess is shaped to urge the locking key toward the inner radial position as the nut moves away from the torque coupler along the axis of rotation.

5. The apparatus as recited in claim 1, wherein the locking key has a spherical shape.

6. The apparatus as recited in claim 1, wherein the second recess is an axially symmetric groove along an inner surface of the nut.

7. The apparatus as recited in claim 6, further including a plurality of first recesses, a plurality of openings, and a plurality of locking keys.

8. The apparatus as recited in claim 1, wherein the lead screw is a ball screw and the nut includes a ball nut.

9. The apparatus as recited in claim 1, wherein the rotary actuator is an electric motor.

10. The apparatus as recited in claim 1, further including a locking pin to engage with the wing when the wing is in the deployed position, the locking pin to prevent movement of the wing.

11. An aircraft comprising:
a fuselage;
a wing movable between a stowed position and a deployed position;
a rotary actuator having an axis of rotation and coupled to a torque coupler, the torque coupler including an opening;
a locking key disposed in the opening, the locking key movable in a radial direction relative to the axis of rotation between an outer radial position and an inner radial position;
a lead screw rotationally coupled to the torque coupler and movable along the axis of rotation relative to the torque coupler between a first axial position and a second axial position, the lead screw having a first recess to align with the opening when the lead screw is in the second axial position to accept the locking key when the locking key is in the inner radial position; and
a nut threadably engaged to the lead screw and rotationally fixed, the nut including a second recess to accept the locking key when the locking key is in the outer radial position and the lead screw is in the first axial position, the locking key to prevent movement of the nut along the axis of rotation relative to the torque coupler when the locking key is in the outer radial position and the lead screw is in the first axial position, the nut operatively coupled to the wing to move the wing from the stowed position to the deployed position.

12. The aircraft as recited in claim 11, wherein the wing contacts the nut when the wing is in the stowed position and the lead screw is in the first axial position, the nut to prevent movement of the wing towards the deployed position.

13. The aircraft as recited in claim 12, further including a set screw coupled to the torque coupler, the set screw to apply a force to the torque coupler along the axis of rotation, the force to move the nut and bias the wing towards the stowed position while the lead screw is in the first axial position.

14. The aircraft as recited in claim 11, wherein the locking key has a spherical shape.

15. The aircraft as recited in claim 11, further including a plurality of first recesses, a plurality of openings, and a plurality of locking keys.

16. The aircraft as recited in claim 11, wherein the lead screw is a ball screw and the nut includes a ball nut.

17. The aircraft as recited in claim 11, wherein the rotary actuator is an electric motor.

18. The aircraft as recited in claim 11, further including a locking pin to engage with the wing when the wing is in the deployed position, the locking pin to prevent movement of the wing.

19. The method of deploying a wing on an aircraft comprising:
rotating a torque coupler about an axis of rotation, the torque coupler including a locking key disposed in an opening of the torque coupler;
translating a lead screw rotationally coupled to the torque coupler toward the torque coupler from a first position to a second position along the axis of rotation, the lead screw threadably engaged to a nut;
unlocking the nut from the torque coupler by disengaging the locking key from the nut;
translating the nut away from the torque coupler along the axis of rotation; and
deploying a wing in response to the translating of the nut.

20. A method as recited in claim 19, further including locking the wing with a locking pin after deploying the wing, the locking pin to prevent motion of the wing.

* * * * *